US008662354B2

(12) United States Patent
Christy et al.

(10) Patent No.: US 8,662,354 B2
(45) Date of Patent: Mar. 4, 2014

(54) SLUDGE HANDLING SYSTEM WITH ROTATING DISCHARGE DEVICE FOR DISCHARGING SLUDGE FROM A BIN

(75) Inventors: Richard W. Christy, Eagleville, PA (US); Michael Quici, Ambler, PA (US); Michael J. Millman, Gilbertsville, PA (US)

(73) Assignee: RDP Technologies, Inc., Norristown, PA (US)

( * ) Notice: Subject to any disclaimer, the term of this patent is extended or adjusted under 35 U.S.C. 154(b) by 328 days.

(21) Appl. No.: 13/027,558

(22) Filed: Feb. 15, 2011

(65) Prior Publication Data

US 2012/0207569 A1 Aug. 16, 2012

(51) Int. Cl.
*B67D 7/06* (2010.01)

(52) U.S. Cl.
USPC ........ 222/185.1; 222/196; 222/242; 222/333; 222/408.5; 222/411; 366/98; 366/252; 414/288

(58) Field of Classification Search
USPC ........... 222/180, 181.1, 185.1, 196–203, 228, 222/236–242, 333, 342, 408.5, 410–414; 366/98, 155.1, 182.1–182.4, 200–201, 366/204–207, 241–242, 244–253, 279–286, 366/313; 414/288, 310–311
See application file for complete search history.

(56) References Cited

U.S. PATENT DOCUMENTS

| | | | |
|---|---|---|---|
| 279,135 A * | 6/1883 | Cornford, Jr. | 222/241 |
| 2,655,411 A * | 10/1953 | Smith | 406/63 |
| 3,055,649 A | 9/1962 | Dretzke, et al. | |
| 3,132,769 A | 5/1964 | Zehrbach | |
| 3,254,777 A | 6/1966 | Vandusen | |
| 3,391,809 A | 7/1968 | Weaver, et al. | |
| 3,493,130 A | 2/1970 | Laidig | |
| RE26,863 E | 4/1970 | Weaver | |
| 3,558,065 A * | 1/1971 | Van Der Lely | 239/661 |
| 3,648,860 A | 3/1972 | Wennberg | |
| 3,679,042 A | 7/1972 | Smoker et al. | |
| 3,817,409 A | 6/1974 | Weaver | |
| 3,871,612 A | 3/1975 | Weaver | |
| 3,874,524 A | 4/1975 | Weaver | |
| 3,977,543 A | 8/1976 | Weaver | |
| 3,981,417 A * | 9/1976 | Fassauer | 406/135 |

(Continued)

OTHER PUBLICATIONS

Hindon, Roplex Discharger, Hindon Corp., Engineered Products Division, 2055 Bee's Ferry Road, Charleston. SC 29414, Phone (803) 763-6616, No. 101790 5M. Date, page(s), volume-issue Nos. unknown.

*Primary Examiner* — Paul R Durand
*Assistant Examiner* — Andrew P Bainbridge
(74) *Attorney, Agent, or Firm* — Paul & Paul

(57) ABSTRACT

A sludge handling system includes at least one bin that receives sewage sludge at an upper end thereof, and that has sloped side wall(s) at the lower end thereof, for directing sewage sludge toward a generally central discharge opening. A rotating discharge device is provided in the form of a thin foil or blade that is rotationally driven to scrape along the sloped side wall(s) of the bin, scraping sludge therefrom, to keep the sludge from adhering to sloped portions of the bin, and to direct sludge out the discharge opening. The rotating discharge device is mounted on and carried by a generally cylindrical rotating table that is motor-driven. A generally cylindrical seal is also carried by the rotating table, and slides along the inside of a sludge discharge chute, at the discharge opening of the bin.

14 Claims, 3 Drawing Sheets

(56) References Cited

U.S. PATENT DOCUMENTS

| | | | | |
|---|---|---|---|---|
| 4,057,152 A | | 11/1977 | Weaver | |
| 4,057,153 A | | 11/1977 | Weaver | |
| 4,076,133 A | | 2/1978 | Weaver | |
| 4,146,145 A | * | 3/1979 | Easton | 414/312 |
| 4,330,233 A | | 5/1982 | Weaver | |
| 5,013,458 A | | 5/1991 | Christy, Sr. et al. | |
| 5,160,068 A | * | 11/1992 | Fishman et al. | 222/352 |
| 5,186,840 A | | 2/1993 | Christy et al. | |
| 5,229,011 A | | 7/1993 | Christy, Sr. et al. | |
| 5,287,993 A | * | 2/1994 | Ford et al. | 222/135 |
| 5,346,616 A | | 9/1994 | Christy, Sr. et al. | |
| 5,401,402 A | | 3/1995 | Christy et al. | |
| 5,405,536 A | | 4/1995 | Christy | |
| 5,433,844 A | | 7/1995 | Christy | |
| 5,468,066 A | * | 11/1995 | Hammonds | 366/139 |
| 5,554,279 A | | 9/1996 | Christy | |
| 5,618,442 A | | 4/1997 | Christy | |
| 5,681,481 A | | 10/1997 | Christy et al. | |
| 5,783,073 A | | 7/1998 | Christy et al. | |
| 5,851,404 A | | 12/1998 | Christy et al. | |
| 6,447,674 B1 | * | 9/2002 | Simon et al. | 210/104 |
| 7,416,673 B2 | | 8/2008 | Christy et al. | |
| 7,669,348 B2 | | 3/2010 | Christy et al. | |
| 7,712,632 B2 | * | 5/2010 | Schwass | 222/58 |
| 8,439,236 B2 | * | 5/2013 | Okabe | 222/411 |
| 2007/0170207 A1 | * | 7/2007 | Kraus et al. | 222/199 |

\* cited by examiner ature, for use as agricultural ground cover, landfill, or the like, as may be desired.

SLUDGE HANDLING SYSTEM WITH ROTATING DISCHARGE DEVICE FOR DISCHARGING SLUDGE FROM A BIN

BACKGROUND OF THE INVENTION

In sludge handling systems, it is known to provide treated sewage sludge to bins, in which the sludge resides until it is desired to discharge sludge from the bins. Generally, one or more bins are provided, and the sludge is delivered into the bins at upper ends thereof, and is discharged from the bins through a discharge opening at a lower end of the bin. Generally, the discharge opening is closed until it is desired to discharge from the bin, and at that point, an openable closure is activated, opening the discharge opening at the bottom of the bin, to allow sewage sludge in the bin to be discharged from the bin, generally onto the bed of a waiting truck disposed therebeneath, with the sludge then being delivered to be used as agricultural ground cover, landfill, or the like, as may be desired.

Sometimes sludge resides in the bin for a day or more, such that it may be become increasingly compacted, with sludge along side wall(s) of the bin becoming adhered to the side wall(s), such that when the discharge gate is opened, sludge may not readily flow outwardly of the bin, via gravity flow, also called mass flow, without some assist. This can particularly occur, as the volume of sludge in the bin decreases, because the lower volume, or "head" results in a reduced weight or pressure condition. As the "head" thus decreases, the resistance to flow increases, as sludge tends to adhere to the walls.

Often, a bin in which sewage sludge is handled may have sloped side wall(s) at the lower end of the bin, leading toward a discharge opening. Sometimes, bridging can occur with sewage sludge at the bottom of a bin, in which the pressure of sewage sludge in the bin creates a dome or arch effect above the bin discharge opening.

One approach that has been used to minimize or obviate such doming or arching, or aggregation of sludge at the bottom of a bin, is to provide a rotationally driven discharge arm, that may be of plow-like construction, to sweep across a bottom floor of the bin, pushing sewage sludge along the bottom floor of the bin toward a central opening. Such a discharge arm will generally be motor driven, either by constant speed or variable speed, and will undercut sewage sludge that may have become compacted during the time that it has been in the bin.

Such devices as these that move a discharge arm across a generally horizontal surface at the bottom of a bin, can be effective in many situations.

However, the longer a bin has been in use, the interior surfaces of the side wall(s) of the bin can become rough due to rusting, or due to other phenomena, such that sewage sludge may not slide easily along sloped surfaces of the bin, downwardly toward a discharge opening, but, rather, may accumulate on sloped surfaces of the bin.

THE PRESENT INVENTION

The present invention is directed to providing a sludge handling system that addresses the removal of sewage sludge that is disposed along the side wall(s) of the bin, in order to prevent the sludge from adhering to, especially sloped side wall portions of the bin, and for directing such sludge toward the discharge opening of the bin.

SUMMARY OF THE INVENTION

The present invention is directed to providing a sludge handling system in which sludge is present in a bin, wherein the bin has side wall(s) that are sloped toward a discharge opening at the bottom of the bin, and wherein a rotating discharge device is provided for traversing along the sloped side wall(s) of the bin, scraping or otherwise moving sludge from the sloped side wall(s) of the bin so that the sludge does not adhere to sloped portions of the side wall(s) and is directed out the discharge opening.

Accordingly, it is an object of this invention to achieve the summary of the invention set forth above, and preferably wherein the rotating discharge device includes a rotating foil arm.

It is another object of this invention to accomplish the above object, wherein the foil arm has upper and lower ends, and is rotatably driven by the lower end of the foil arm being carried by a generally cylindrical table that, in turn, has a discharge opening extending therethrough.

It is yet another object of this invention to accomplish the above objects, wherein the rotatably driven table is driven from its periphery.

It is yet another object of this invention to accomplish the above objects and to provide a sealing device at the periphery of the bottom discharge opening of the bin, between the bin and a rotatably driven generally cylindrical table.

It is yet another object of this invention to accomplish the above objects, wherein a generally fixedly mounted conical structure is provided, for providing pressure relief for relieving pressure from the sludge in the bin at the location of the discharge opening and for shielding the weight of sludge in the bin from rotating components of the discharge mechanism.

Other objects and advantages of the present invention will be readily apparent from a reading of the brief figure descriptions, the detailed descriptions of the preferred embodiments, and the appended claims.

BRIEF DESCRIPTIONS OF THE DRAWING FIGURES

FIG. 1 is a vertical cross-sectional view of a bin of a sludge handing system, having sloped side wall(s) and a bottom discharge opening, and with a rotating blade-like discharge arm of the foil type being illustrated, carried by a motor-driven rotating table that has a central discharge, where the foil may move along the inner sloped side walls of the bin, loosening sludge from the sloped side wall(s) of the bin and directing it toward the bin discharge opening.

DETAILED DESCRIPTIONS OF THE PREFERRED EMBODIMENTS

Figure 1:
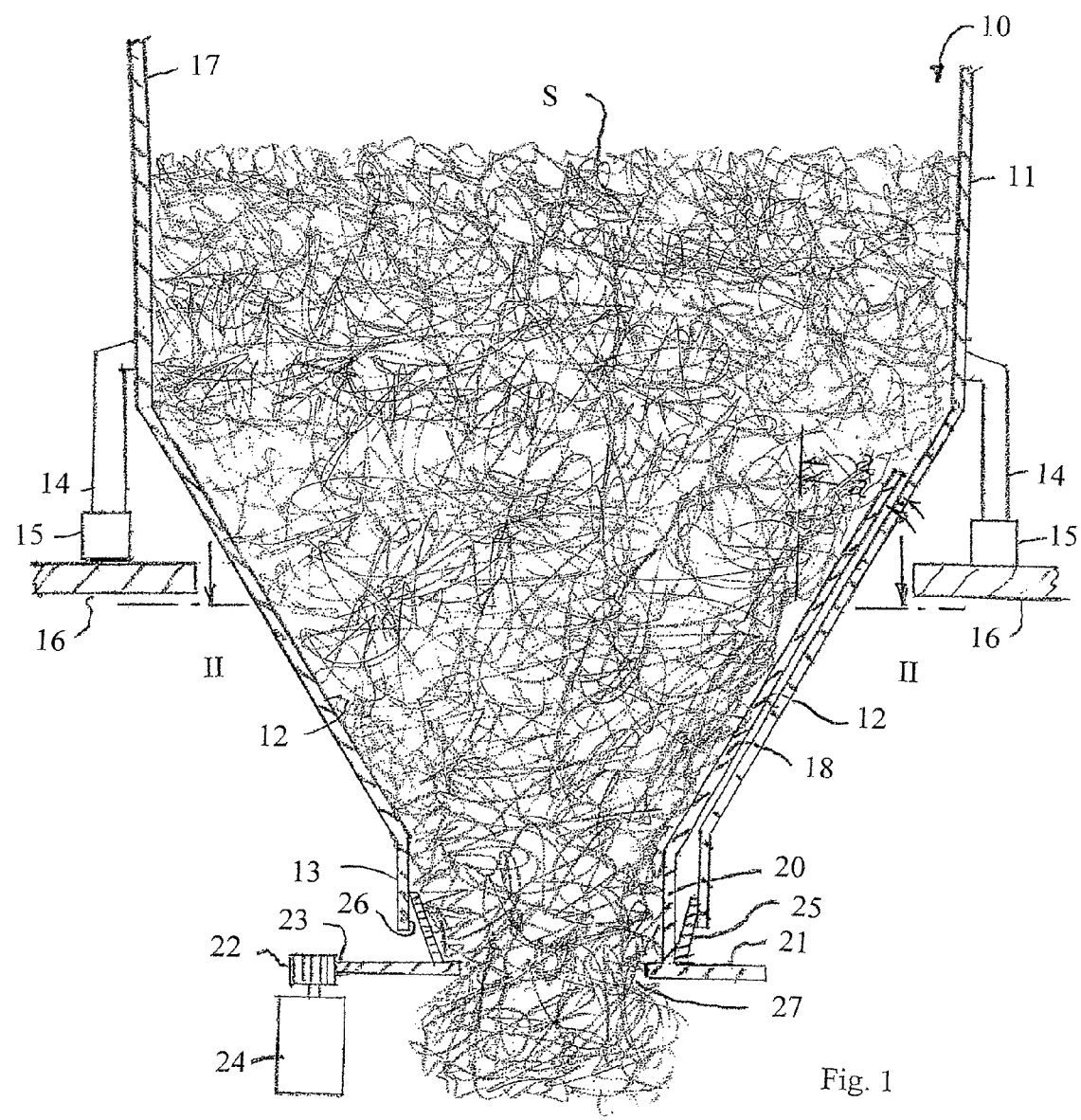

Referring now the drawings in detail, reference is first made to FIG. 1, wherein a sludge handling system 10 is provided, in which sewage sludge that has been treated with a treatment medium, generally a flocculant, and sometimes calcium appears as sewage sludge S, of generally clay-like consistency, provided into a bin 11, generally through an opening at an upper end thereof (not shown), and wherein the sludge accumulates in the bin 11, both along the generally vertical cylindrical inner walls 17 thereof, and as the sludge S moves downwardly through the bin 11, is directed toward a bottom discharge opening 27 thereof, after passing along angularly sloped surface portions 12 at the bottom of the bin 11.

The bin 11 is supported on suitable legs 14, that, in turn are carried by load cells 15 that measure the weight of the bin and sewage sludge therein, for delivering such weight information to a computer (not shown). The load cells 15 are carried by a suitable floor 16 of a warehouse or garage, in which the bin is generally located.

The bin 11, beneath the sloped side wall portions 12 thereof, is provided with a generally cylindrical discharge 13.

Figure 2:
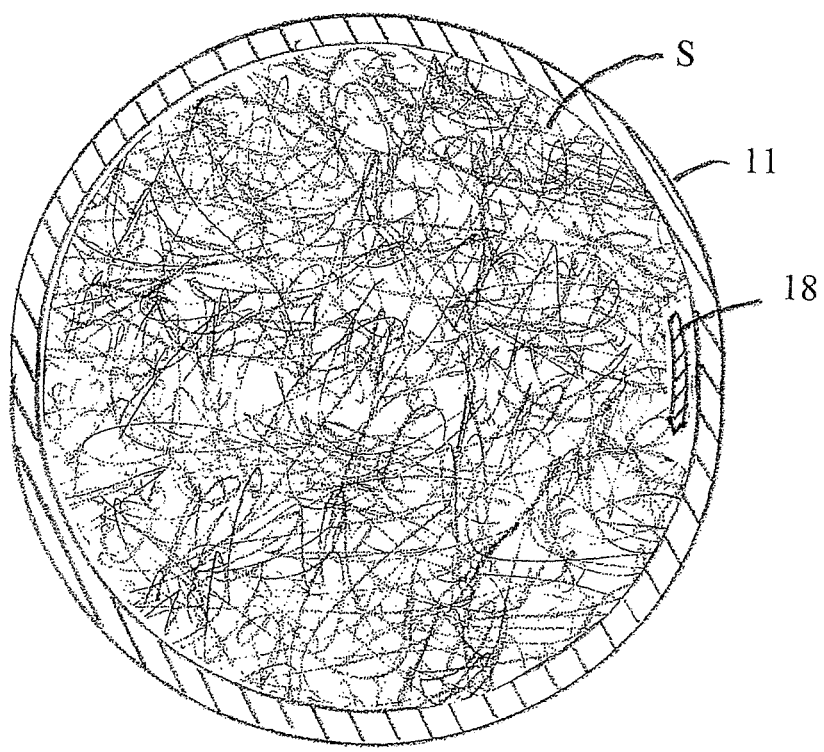
FIG. 2 is a transverse sectional view taken along the line II-II of FIG. 1, and wherein the generally flat, blade-like foil configuration for the discharge arm is illustrated, for sliding along the inner sloped surface of the bin.

A discharge arm 18, of a thin blade-like foil type, shown in FIG. 2, is provided. The discharge arm 18 is carried by a mounting structure 20, that, in turn, is fastened to or mounted on and carried by a rotatably driven, generally cylindrical table 21. The table 21 has the discharge opening 27 extending therethrough, whereby sludge S can be discharged via the opening 27, upon opening of a discharge gate (not shown) beneath the table 21.

The table 21 is provided with a suitable means for being rotated, such as by having gear teeth (not shown) at its periphery 23, which peripheral teeth can be engaged by a spur gear 22 driven by a suitable fixed speed or variable speed motor 24. A seal 25 is likewise mounted to and carried by the table 21, and can slideably engage the cylindrical interior surface 26 of the discharge 13, as the table 21 rotates, with the weight of the sewage sludge S facilitating the pressing of the seal 25 against the interior surface 26 of the discharge 13. The seal 25 is thus a peripheral seal and operates in sliding engagement against the surface 26 at the bottom of the bin 11.

The foil arm 18 is preferably at the same angle "a" to the vertical as the sloped portions 12 of the bottom of the bin, and is thus adapted to traverse the sloped portions 12 of the bottom of the bin 11, spaced slightly therefrom, about ½ inch or more, scraping or otherwise moving sludge from such sloped portions, to assure that it does not adhere to the sloped portions of the side wall(s), as well as directing the sludge S that is scraped therefrom, toward the central discharge opening 27. In most instances, when the bin is full or substantially full, the sludge S will exit the bin under gravity flow, or mass flow. However, as the volume or "head" of sludge S in the bin decreases, there is a greater need for using a rotating discharge device in the form of the foil arm 18. That is, it is not always necessary to have the foil arm 18 rotating; but as the "head" of sludge S in the bin decreases, the rotation of the foil arm can then be activated to direct sludge toward the central discharge opening 27. When the foil arm 18 is rotating, the function of the same in removing sludge S from the generally conical surface of the bin is generally in accordance with the Bernoulli principle, such that the rotating movement of the foil arm 18 creates a low pressure zone in the space between the foil arm and the conical surface of the bin, which low pressure zone facilitates the lifting of sludge from the conical surface of the bin, thereby facilitating the movement of the sludge S to be discharged via the discharge opening 27.

Figure 3:
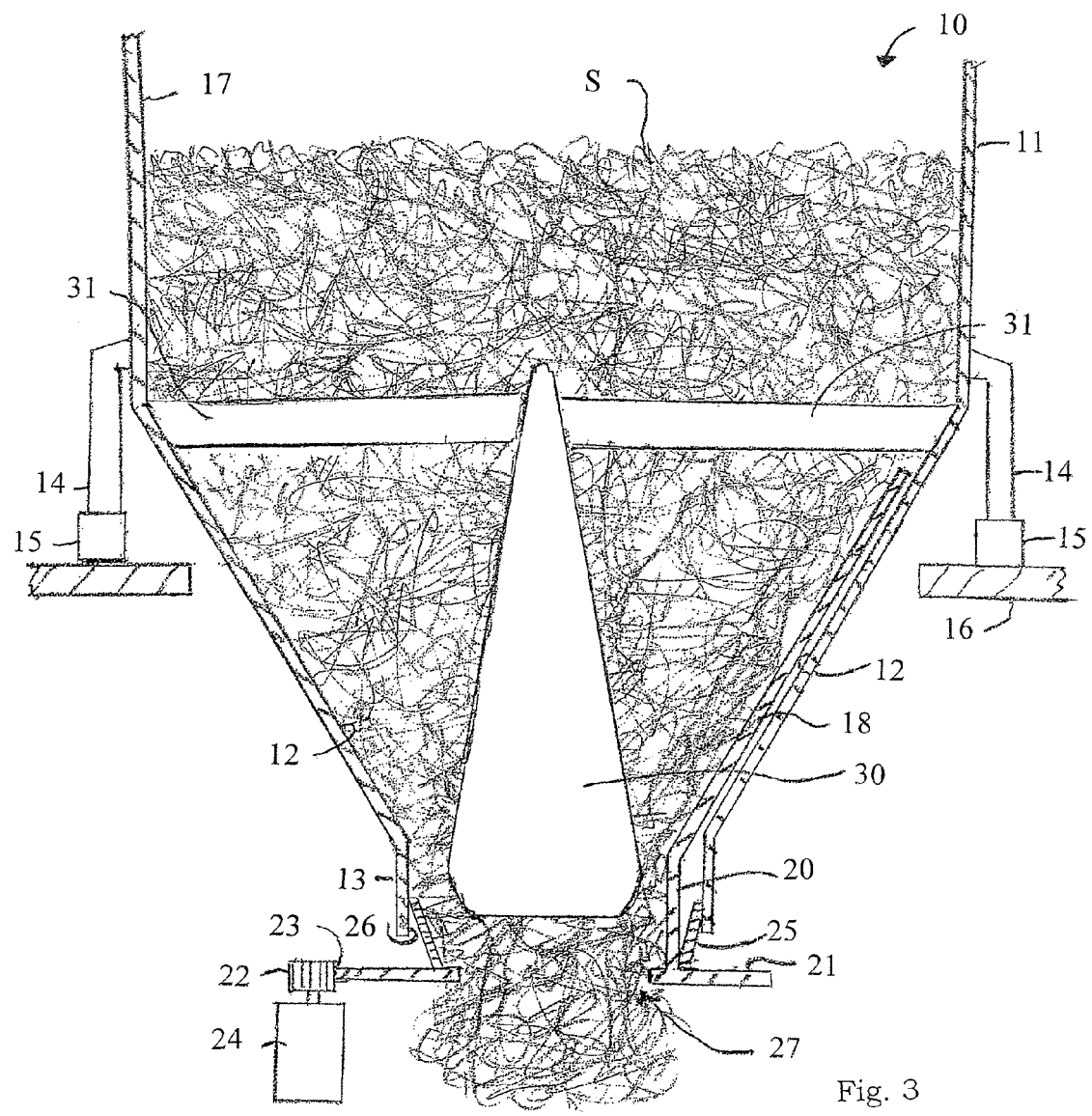
FIG. 3 is an illustration like that of FIG. 1, but of an alternative embodiment, in which a fixedly mounted conical structure is provided, for providing pressure relief relative to sludge in the bottom of the bin and for shielding the weight of the sludge from the rotating discharge mechanism.

With reference now to FIG. 3, a structure similar to that of FIG. 1 is illustrated, but wherein an optional generally conical structure 30 is provided in the bin, supported from the bin side wall(s) by one or more radial bar-like supports 31, that mount the conical structures 30 fixedly in the bin 11, near the lower end thereof. The conical structure 30 prevents the formation of a dome or arch in sludge at the bottom of the bin, often compacted sludge, that may be in the bin, especially sludge above the location of the discharge opening 27, and the conical structure 30 additionally shields the weight of the sludge in the bin from impacting on the rotating items such as the rotating table 21, the foil arm 18, and the frusto-conical seal 25 at the bottom of the bin 11. The conical structure 30, while being highly desirable in some instances, may be dispensed with in other instances, in which the rotating foil arm 18 is sufficient for facilitating discharge of sludge S from the bottom of the bin 11 by scraping or otherwise moving the same from sloped side wall portions 12 of the bin, and directing the sludge S out the discharge opening 27.

It will be apparent from the foregoing that various modifications may be made in the apparatus described above, as well as in the use and operation of the same, as may suggest themselves to those skilled in the art, upon a reading of the specification, all within the spirit and scope of the invention, as defined in the appended claims.

What is claimed is:

1. In a sludge handling system in which treated sewage sludge is discharged from at least one bin, and wherein the at least one bin has an inlet at an upper end for receiving sludge therein, a bottom central discharge opening for discharge of sludge therethrough and side wall(s), with at least portions of the side wall(s) being generally conically sloped toward a generally circular interior discharge surface terminating in the bottom central discharge opening, the at least one bin being provided with rotating discharge means for traversing along the sloped portions of the side wall(s) and comprising means for moving sludge from the sloped portions of the side wall(s) to the central discharge opening and comprising means whereby the sludge does not adhere to the sloped portions of the side wall(s) and is directed out the central discharge opening; wherein the rotating discharge means includes a rotating generally flat foil blade arm disposed substantially at the same angle to the vertical as the sloped portions of the sidewall(s); wherein the foil blade arm has an upper end and a lower end and is mounted on a rotatably driven, generally cylindrical table, at the lower end of the foil blade arm, and wherein the table has said central discharge opening extending therethrough.

2. The system of claim 1 wherein the rotatably driven table includes motor means for driving the table from a periphery thereof.

3. The system of claim 1 including sealing means providing a peripheral seal between said bottom discharge opening of said bin and said rotatably driven generally cylindrical table.

4. The system of claim 3, wherein said peripheral seal is carried by said rotatably driven generally cylindrical table, for rotation therewith.

5. The system of claim 4, wherein said peripheral seal is in sliding engagement against the interior of the sloped wall(s) of the bin at the location of the bin bottom central discharge opening.

6. The system of claim 1, wherein the discharge opening is generally cylindrical.

7. The system of claim 1, wherein the at least one bin includes a fixably mounted generally conical structure for preventing a dome formation of sludge in the at least one bin, at the location of the said discharge opening and for shielding weight of sludge in the at least one bin from said rotating discharge means.

8. The system of claim 1, wherein the rotatably driven table includes motor means for driving the table from a periphery thereof, including sealing means providing a sliding peripheral seal between said generally circular interior discharge surface above said bottom discharge opening of said bin and said rotatably driven generally cylindrical table, wherein said peripheral seal is responsive the weight of sewage sludge in the at least one bin in pressing engagement against said circular interior discharge surface and is carried by said rotatably driven generally cylindrical table, for rotation therewith.

9. The system of claim 8, wherein the discharge opening is generally cylindrical.

10. The system of claim 8 and wherein the at least one bin includes a fixably mounted generally conical structure for preventing a dome formation of sludge in the at least one bin, at the location of the said discharge opening and for shielding weight of sludge in the at least one bin from said rotating discharge means.

11. The system of claim 1, wherein the foil blade arm comprises a means for scraping sludge from the sloped portions of the side wall(s).

12. The system of claim 1, wherein the foil blade arm is selectively rotatable depending upon the volume of sludge in the bin.

13. The system of claim 1, wherein the rotating foil blade arm comprises means for creating a low pressure zone between the foil arm and the sloped portions of the side wall(s) whereby the low pressure zone facilitates lifting the sludge from the generally conical surface of the bin to facilitate movement of the sludge to the central discharge opening of the bin.

14. The system of claim 1, including a computer and wherein the bin is supported on a load cell(s) that comprise for measuring the weight of the bin and sewage sludge disposed therein for delivering information of the said weight to the computer.

* * * * *